(12) United States Patent
Gao et al.

(10) Patent No.: US 11,389,759 B2
(45) Date of Patent: Jul. 19, 2022

(54) HORIZONTAL TYPE COMBINED FILTER SEPARATOR

(71) Applicant: Shenyang Xinlian Petro-chemical Equipment Co., Ltd., Shenyang (CN)

(72) Inventors: Yang Gao, Shenyang (CN); Jinguo Cai, Shenyang (CN); Haotian Liu, Shenyang (CN); Jingchao Zhao, Shenyang (CN)

(73) Assignee: Shenyang Xinlian Petro-chemical Equipment Co., Ltd., Shenyang (CN)

( * ) Notice: Subject to any disclaimer, the term of this patent is extended or adjusted under 35 U.S.C. 154(b) by 0 days.

(21) Appl. No.: 17/470,362

(22) Filed: Sep. 9, 2021

(65) Prior Publication Data

US 2022/0072460 A1 Mar. 10, 2022

(30) Foreign Application Priority Data

Sep. 10, 2020 (CN) .......................... 202010945419.X (51) Int. Cl.
| | | |
|---|---|---|
| *B01D 45/16* | (2006.01) | |
| *B01D 50/20* | (2022.01) | |
| *B01D 46/00* | (2022.01) | |
| *C10L 3/10* | (2006.01) | |

(52) U.S. Cl.
CPC ......... *B01D 45/16* (2013.01); *B01D 46/0005* (2013.01); *B01D 50/20* (2022.01); *C10L 3/101* (2013.01)

(58) Field of Classification Search
CPC .... B01D 45/16; B01D 46/0005; B01D 50/20; B01D 46/2407; C10L 3/101; C10L 2290/547
See application file for complete search history.

(56) References Cited

U.S. PATENT DOCUMENTS

| | | | | |
|---|---|---|---|---|
| 2,586,221 A | * | 2/1952 | Clarence ............ | B01D 19/0042 96/190 |
| 3,063,220 A | * | 11/1962 | Wallace ................... | B01D 3/16 96/365 |
| 3,888,644 A | * | 6/1975 | Holland ................. | B01D 46/00 55/318 |
| 4,180,391 A | * | 12/1979 | Perry, Jr ................ | B01D 45/16 55/424 |

(Continued)

*Primary Examiner* — Hung Q Nguyen
(74) *Attorney, Agent, or Firm* — Capitol City TechLaw, PLLC; Samuel P. Burkholder (57) ABSTRACT

The present disclosure discloses a horizontal type combined filter separator, including a barrel-shaped structure. The inside of the shell is sequentially divided into a first cavity, a second cavity and a third cavity from a first end and a second end. A fourth cavity is formed in the first cavity. The horizontal type combined filter separator further includes a communicating pipe with one opened end and one closed end; the closed end of the communicating pipe extends into the first cavity, and the opened end passes through the second cavity and extends into the third cavity. The shell is provided with a gas intake connection pipe communicating with the fourth cavity. A plurality of cyclone separators are provided; a gas inlet of each cyclone separator communicates with the fourth cavity; a dust discharging port communicates with the first cavity; and an exhaust port extends into the communicating pipe.

8 Claims, 6 Drawing Sheets

(56) References Cited

U.S. PATENT DOCUMENTS

| | | | |
|---|---|---|---|
| 8,986,431 B2 * | 3/2015 | Cabourdin | B01D 46/90 55/482 |
| 2009/0196806 A1 * | 8/2009 | Larnholm | B04C 5/103 422/269 |
| 2011/0011796 A1 * | 1/2011 | Nickson | B04C 5/14 210/512.2 |
| 2013/0247764 A1 * | 9/2013 | Kvamsdal | B01D 19/0057 96/208 |
| 2013/0276416 A1 * | 10/2013 | Schook | B01D 45/08 55/462 |
| 2014/0163298 A1 * | 6/2014 | Kuzmin | B01D 11/0461 422/258 |

* cited by examiner

HORIZONTAL TYPE COMBINED FILTER SEPARATOR

CROSS REFERENCE TO RELATED APPLICATION(S)

This patent application claims the benefit and priority of Chinese Patent Application No. 202010945419.X, filed on Sep. 10, 2020, the disclosure of which is incorporated by reference herein in its entirety as part of the present application.

TECHNICAL FIELD

The present disclosure relates to the technical field of filter separators, and particularly relates to a horizontal type combined filter separator.

BACKGROUND ART

Gas, such as natural gas, usually contains more solids and liquid impurities. At present, for natural gas purification, cyclone separation equipment and filter separator equipment are usually provided respectively, and the two sets of equipment are connected together through valves and pipelines. The natural gas passes through the cyclone separation equipment first to remove large-diameter impurity particles from the gas, and then enters the filter separator equipment to filter and separate the impurities in the gas to meet the requirement of gas purification. However, since a cyclone separator and a filter separator are used to purify the natural gas, the equipment occupies a large area and is complicated in structure. Therefore, how to solve the problems in the existing art that the equipment for purifying natural gas occupies a large area and has a complex structure is a technical problem urgently needed to be solved by those skilled in the art.

SUMMARY

In order to solve the above technical problems, the present disclosure provides a horizontal type combined filter separator with simple and compact structure.

To achieve the above-mentioned purpose, the present disclosure provides the following solution.

The present disclosure provides a horizontal type combined filter separator, including a filter separation assembly, a cyclone separator for tangential gas feeding, and a shell which has a closed cavity inside and is of a barrel-shaped structure; the inside of the shell is sequentially divided into a first cavity, a second cavity and a third cavity from a first end to a second end; and a fourth cavity with a volume less than that of the first cavity is formed in the first cavity. The horizontal combined filter separator further includes a communicating pipe with one opened end and one closed end; the closed end of the communicating pipe extends into the first cavity, and the opened end passes through the second cavity and extends into the third cavity; the shell is provided with a gas intake connection pipe communicating with the fourth cavity; a plurality of cyclone separators are provided; a gas inlet of each cyclone separator communicates with the fourth cavity; a dust discharging port communicates with the first cavity; an exhaust port extends into the communicating pipe; the third cavity communicates with the second cavity through the filter separation assembly; and the shell is provided with a gas outlet connection pipe communicating with the second cavity.

Further, a plurality of filter separation assemblies are provided; each filter separation assembly includes a filter element and a filter element bracket; the number of the filter elements is the same as the number of the filter element brackets, and the filter elements and the filter element brackets correspond to each other on a one-to-one basis; each filter element bracket is of a hollow structure, one end of which communicates with the second cavity, and the other end of which communicates with the third cavity; the filter elements are arranged at the ends of the corresponding filter element brackets located in the third cavity to filter gas entering the second cavity.

Further, the shell includes a cylindrical section with openings in two ends, a closure head arranged at a first end of the cylindrical section and fixedly connected with the cylindrical section, and a fast-opening blind arranged at a second end of the cylindrical section and fixedly connected with the cylindrical section.

Further, the closure head is a rotator structure protruding away from the cylindrical section; and the closure head is also provided with an access hole communicating with the inside of the closure head and a cover plate used to close and open the access hole.

Further, a top of the communicating pipe is provided with a slope or a curved surface; the slope or curved surface extends in an axial direction of the communicating pipe; and the exhaust ports of all the cyclone separators pass through the top of the communicating pipe and communicate with the inside of the communicating pipe.

Further, two slopes are provided, which are intersected to form a conical structure; the cyclone separators are arranged on the two slopes; or, the cyclone separators are arranged on an intersecting line of the two slopes.

Further, the first cavity, the second cavity, and the third cavity are respectively provided with process connection pipes communicating with the insides of the cavities.

Further, a saddle support is arranged on an outer wall of the shell.

Compared with the existing art, the following beneficial technical effects are achieved in the present disclosure.

The horizontal type combined filter separator of the present disclosure, including a filter separation assembly, a cyclone separator for tangential gas feeding, and a shell which has a closed cavity inside and is of a barrel-shaped structure. The inside of the shell is sequentially divided into a first cavity, a second cavity and a third cavity from a first end and a second end. A fourth cavity with a volume less than that of the first cavity is formed in the first cavity. The horizontal type combined filter separator further includes a communicating pipe with one opened end and one closed end; the closed end of the communicating pipe extends into the first cavity, and the opened end passes through the second cavity and extends into the third cavity. The shell is provided with a gas intake connection pipe communicating with the fourth cavity. A plurality of cyclone separators are provided; a gas inlet of each cyclone separator communicates with the fourth cavity; a dust discharging port communicates with the first cavity; and an exhaust port extends into the communicating pipe. The third cavity communicates with the second cavity through the filter separation assembly; and the shell is provided with a gas outlet connection pipe communicating with the second cavity.

During use, gas to be purified, such as natural gas, is fed into the fourth cavity from the gas intake connection pipe in the shell. Since the gas inlet of the cyclone separator communicates with the fourth cavity, the gas entering the fourth cavity will enter the cyclone separator; large-diameter particle impurities in the cyclone separator enter the first cavity from the dust discharging port for collection, and the purified gas enters the communicating pipe from the exhaust port of the cyclone separator and enters the third cavity along the communicating pipe. The third cavity communicates with the second cavity through the filter separation assembly, so that in the process that the gas entering the third cavity enters the second cavity, solid impurities and liquid impurities in the gas can be removed by the filter separation assembly to meet a purification requirement, and the gas is discharged through the gas outlet connection pipe communicating with the second cavity.

As such, the horizontal type combined filter separator provided by the present disclosure is simple and compact in structure, occupies a smaller area, and can effectively reduce the use area of an equipment field, reduce the capital investment of items and reduce the cost and time for later operation and maintenance of the equipment.

BRIEF DESCRIPTION OF THE DRAWINGS

To describe embodiments of the present disclosure or technical solutions in the existing art more clearly, drawings required to be used in the embodiments will be briefly introduced below. It is apparent that the drawings in the descriptions below are only some embodiments of the present disclosure. Those of ordinary skill in the art also can obtain other drawings according to these drawings without making creative work.

Reference signs in the drawings: 1: fast-opening blind; 2: process connection pipe; 3: gas outlet connection pipe; 4: shell; 5: gas intake connection pipe; 6: access hole; 7: cyclone separator; 8: communicating pipe; 9: filter separation assembly; 10: saddle support; 11: filter element; 12: filter element bracket; 13: partition plate; 14: supporting plate; 15: baffle plate; 16: gas inlet; 17: exhaust port; 18: dust discharging port; and 19: blade.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments.

Based on the embodiments in the present disclosure, all other embodiments obtained by those of ordinary skill in the art without creative work shall fall within the protection scope of the present disclosure.

The present disclosure aims to provide a horizontal type combined filter separator with simple and compact structure.

In order to make the above-mentioned purposes, characteristics and advantages of the present disclosure more obvious and understandable, the present disclosure is further described in detail below with reference to the accompanying drawings and specific implementation modes.

Figure 1:
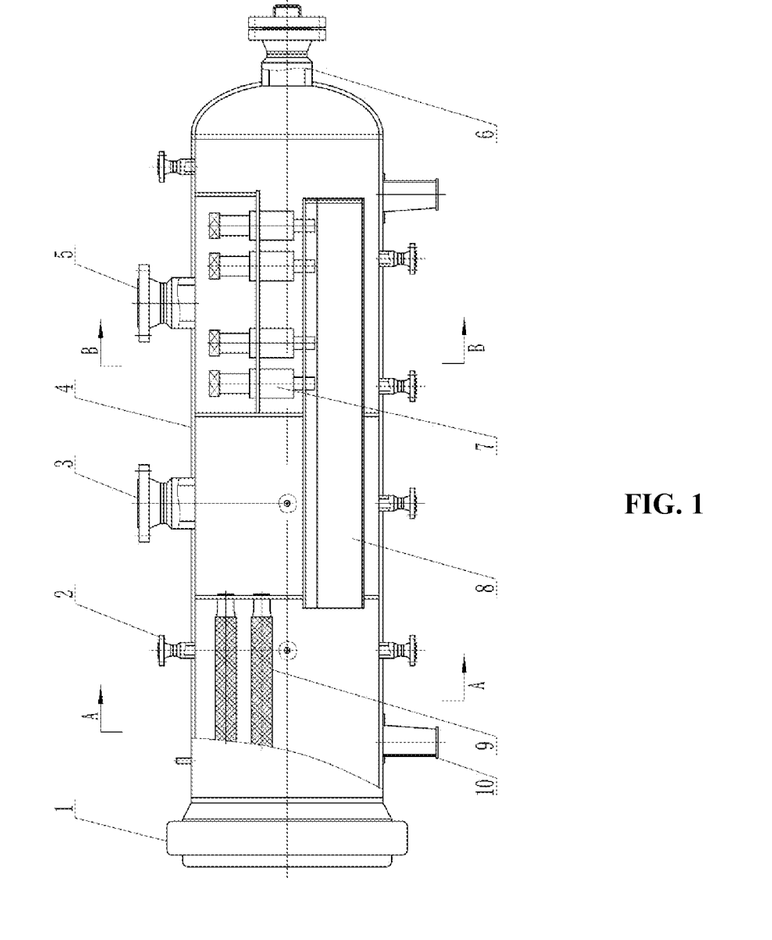
FIG. 1 is a schematic structural diagram of a horizontal type combined filter separator in the embodiments of the present disclosure.
Figure 2:
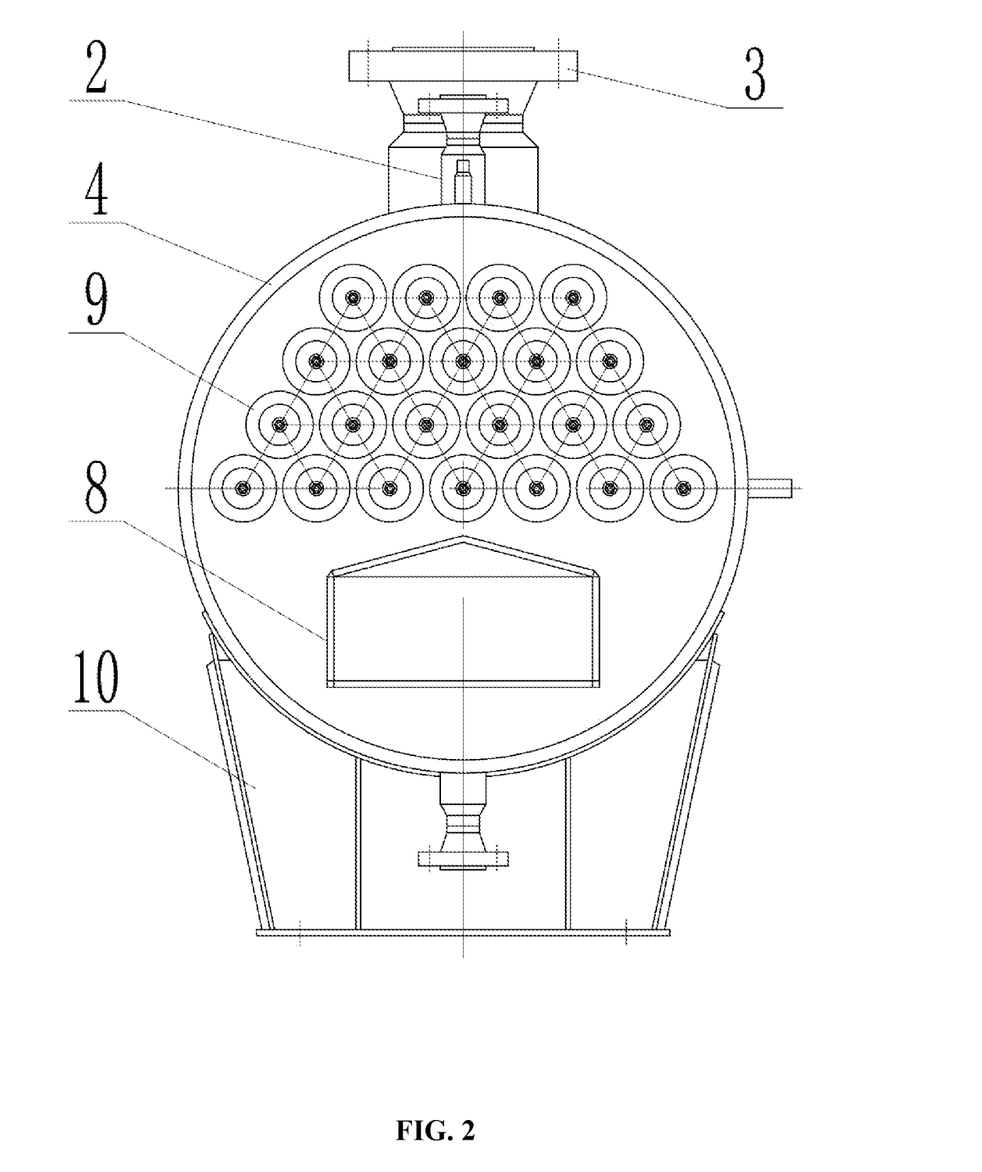
FIG. 2 is a cutaway view of FIG. 1 along A-A.
Figure 3:
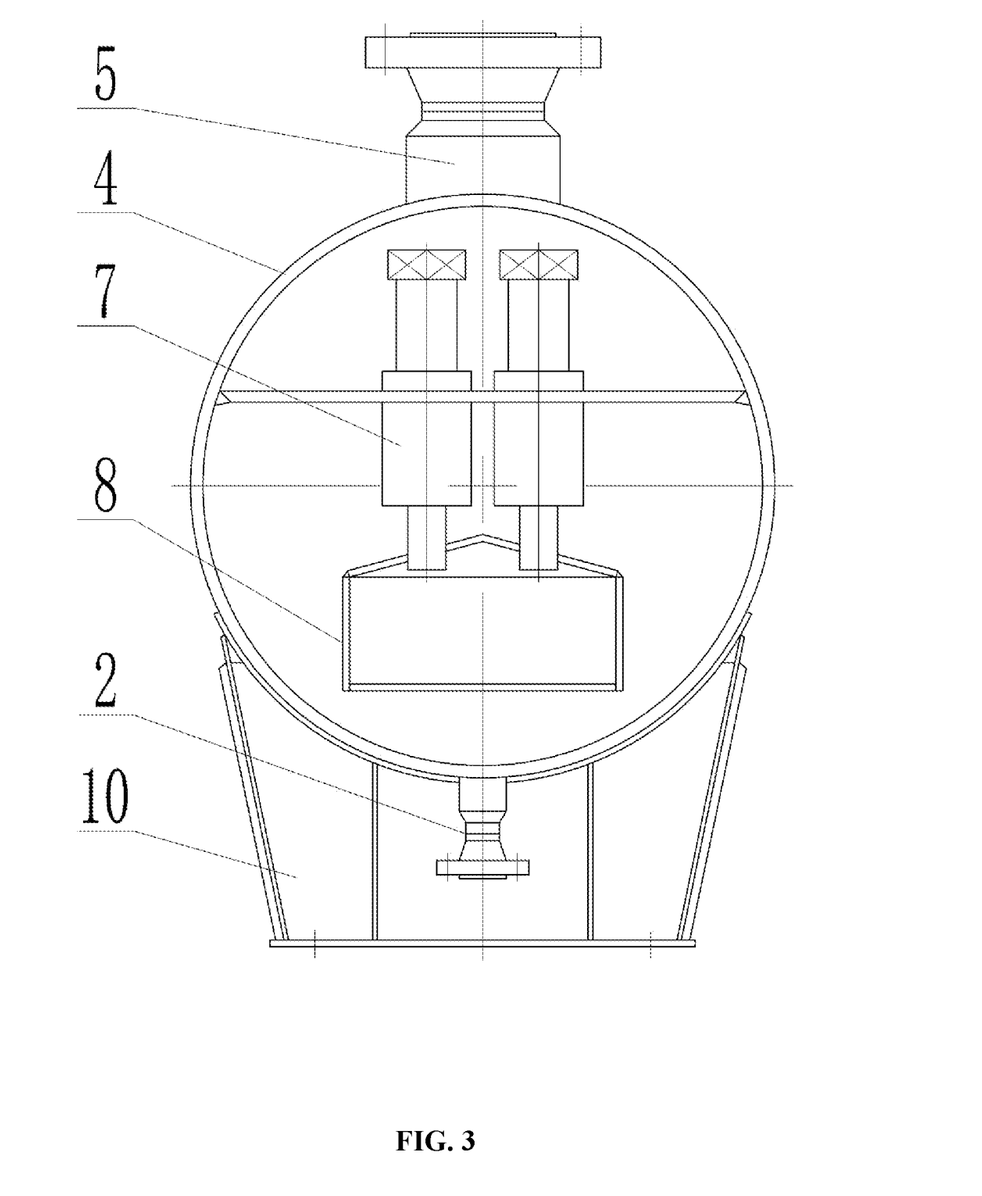
FIG. 3 is a cutaway view of FIG. 1 along B-B.
Figure 4:
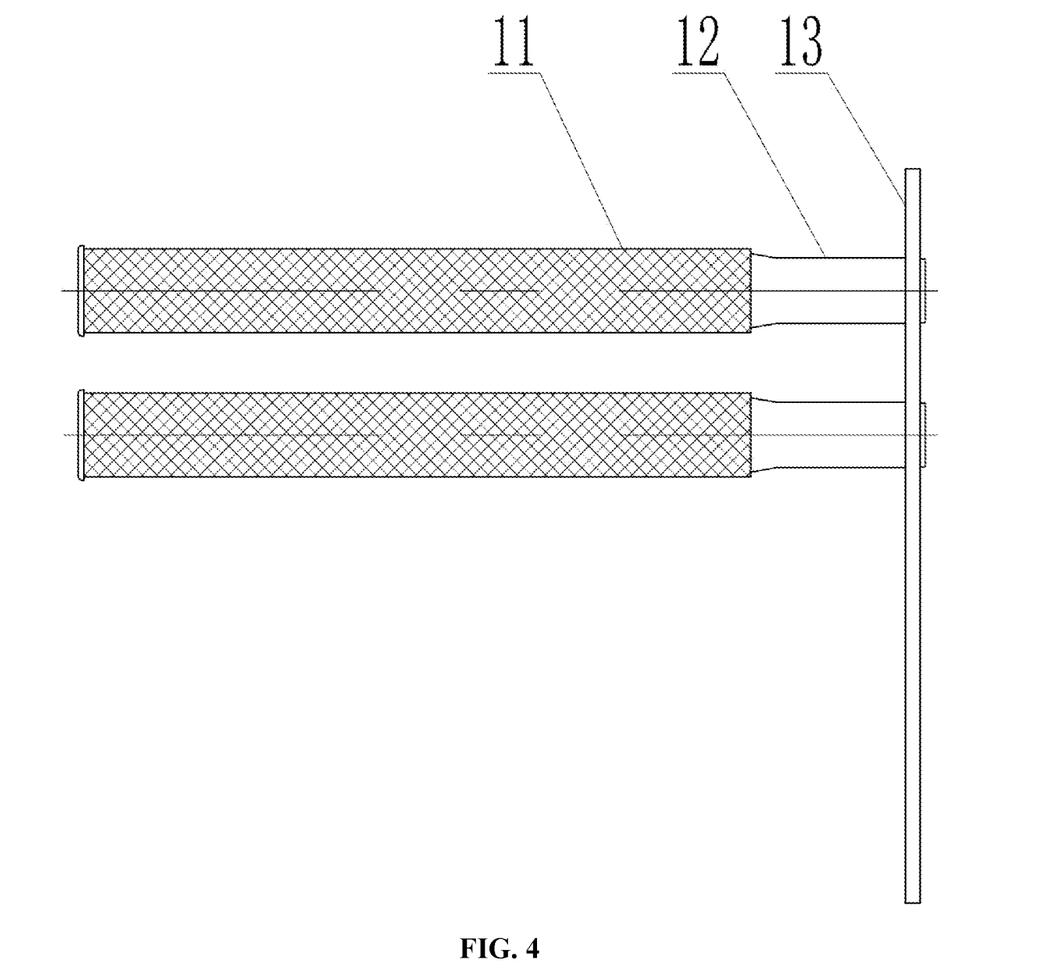
FIG. 4 is a schematic diagram of an installation state of a filter separation assembly in the embodiments of the present disclosure.
Figure 5:
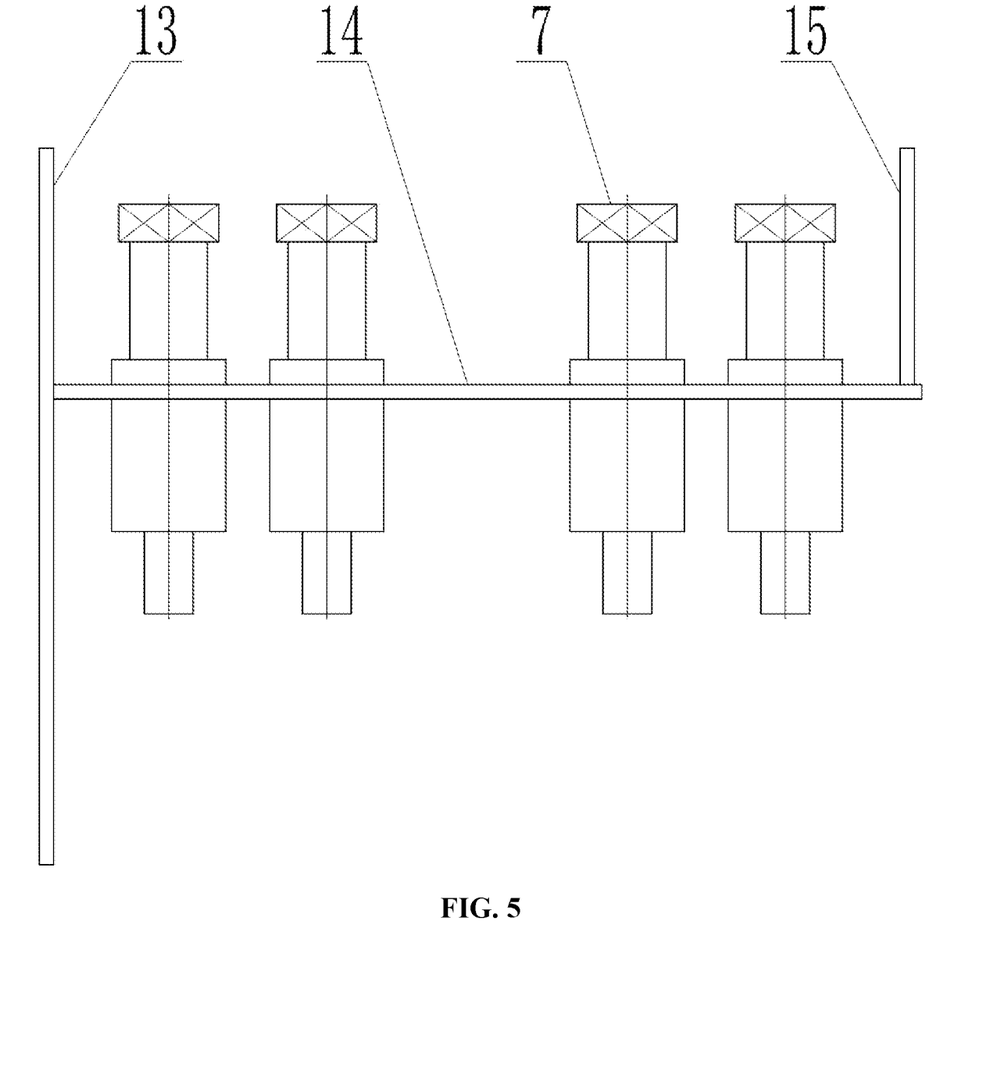
FIG. 5 is a schematic diagram of an installation state of a cyclone separator in the embodiments of the present disclosure.
Figure 6:
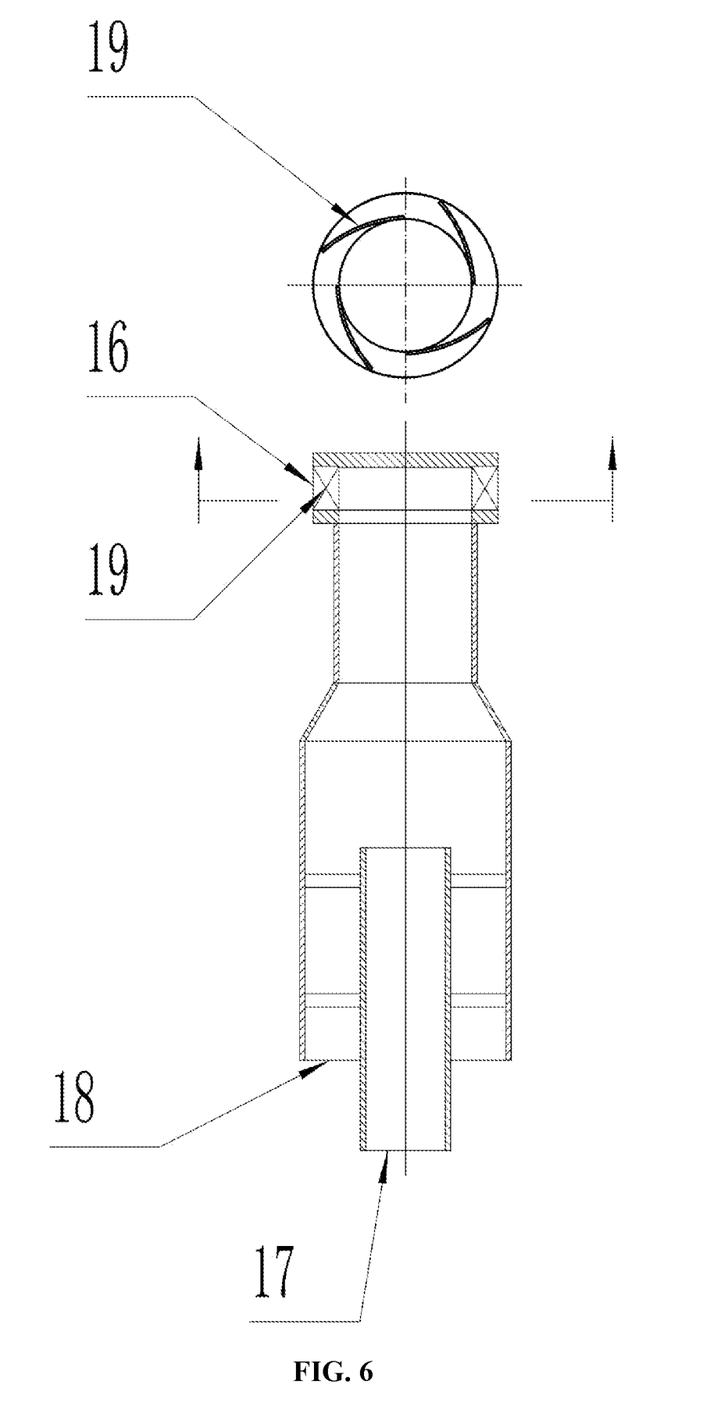
FIG. 6 is a schematic structural diagram of a cyclone separator in the horizontal type combined filter separator in FIG. 1.

As shown in FIGS. 1-5, the horizontal type combined filter separator provided by the embodiments of the present disclosure includes a filter assembly, a cyclone separator 7 for tangential gas feeding, and a shell 4 which has a closed cavity inside and is of a barrel-shaped structure. The inside of the shell 4 is sequentially divided into a first cavity, a second cavity and a third cavity from a first end to a second end; and a fourth cavity with a volume less than that of the first cavity is formed in the first cavity. FIG. 1 is taken as an example. The upper end in the drawing is the first end of the shell 4, and the lower end in the drawing is the second end of the shell 4. Optionally, two partition plates 13 are arranged in the shell 4 to divide the inside of the shell 4 into three cavities, i.e., the first cavity, the second cavity and the third cavity are respectively formed. The partition plates 13 can be connected with the inner wall of the shell 4 in a welded manner. Referring to FIGS. 1, 3, and 5, a supporting plate 14 and a baffle plate 15 are arranged in the first cavity; one end of the supporting plate 14 is connected with the partition plate 13, and the other end is connected with the baffle plate 15; and two sides of the supporting plate 14 are respectively connected with the inner wall of the shell 4, that is, the supporting plate 14, the partition plate 13, part of the inner wall of the shell 4, and part of the partition plate 13 divide the first cavity to form one closed cavity and the fourth cavity. The horizontal type combined filter separator further includes a communicating pipe 8 with one opened end and one closed end. The closed end of the communicating pipe 8 extends into the first cavity, and the opened end passes through the second cavity and extends into the third cavity. A gas intake connection pipe 5 communicating with the fourth cavity is arranged on the shell 4, so that the gas to be purified can enter the fourth cavity through the gas intake connection pipe 5. There are a plurality of cyclone separators 7. Referring to FIG. 6, each cyclone separator 7 includes a gas inlet 16, an exhaust port 17, and a dust discharging port 18. The gas inlet 16 is disposed in a circumferential direction of the cyclone separator 7, so that the gas enters the cyclone separator 7 from a tangent direction; a blade 19 is also arranged at the gas inlet 16; and the blade 19 may drive the gas to rotate in the cyclone separator 7. In the rotating process of the gas, particle impurities with large diameters and large mass are thrown onto the inner wall of the cyclone separator 7 and slide to the dust discharging port 18 along the inner wall for discharging; and the purified gas is discharged from the exhaust port 17 in the center of the cyclone separator 7. The gas inlet 16 of each cyclone separator 7 communicates with the fourth cavity, so that the gas to be purified in the fourth cavity enters the cyclone separator 7 from the gas inlet 16. The dust discharging port 18 of each cyclone separator 7 communicates with the first cavity, so that the impurities enter the first cavity for collection. The exhaust port 17 of each cyclone separator 7 extends into the communicating pipe 8 to discharge the purified gas into the communicating pipe 8 and enable the purified gas to enter the third cavity along the communicating pipe 8. The third cavity communicates with the second cavity through the filter separation assembly 9, so that the gas in the third cavity enters the second cavity after solid and liquid impurities are filtered and separated through the filter separation assembly 9. The shell 4 is provided with a gas outlet connection pipe 3 communicating with the second cavity to discharge the separated purified gas.

During use, gas to be purified, such as natural gas, is fed into the fourth cavity from the gas intake connection pipe 5 in the shell 4. Since the gas inlet 16 of the cyclone separator 7 communicates with the fourth cavity, the gas entering the fourth cavity will enter the cyclone separator 7; large-diameter particle impurities in the cyclone separator 7 enter the first cavity from the dust discharging port 18 for collection, and the purified gas enters the communicating pipe 8 from the exhaust port 17 of the cyclone separator 7 and enters the third cavity along the communicating pipe 8. The third cavity communicates with the second cavity through the filter separation assembly 9, so that in the process that the gas entering the third cavity enters the second cavity, solid impurities and liquid impurities in the gas can be removed by the filter separation assembly 9 to meet a purification requirement, and the gas is discharged through the gas outlet connection pipe 3 communicating with the second cavity.

As such, the horizontal type combined filter separator provided by the present disclosure is simple and compact in structure, occupies a smaller area, and can effectively reduce the use area of an equipment field, reduce the capital investment of items and reduce the cost and time for later operation and maintenance of the equipment.

Referring to FIGS. 1, 2, and 4, in some embodiments, there are a plurality of filter separation assemblies 9. Each filter separation assembly 9 includes a filter element 11 and a filter element bracket 12. The number of the filter elements 11 is the same as the number of the filter element brackets 12, and the filter elements and the filter element brackets correspond to each other on a one-to-one basis; each filter element bracket 12 is of a hollow structure, one end of which communicates with the second cavity, and the other end of which communicates with the third cavity. The filter elements 11 are arranged at the ends of the corresponding filter element brackets 12 located in the third cavity to filter gas entering the second cavity. As such, the gas in the third cavity is filtered by the filter element 11, then enters the second cavity through the filter element bracket 12, and is discharged, so as to complete separation of the impurities from the gas.

Referring to FIG. 1, in some embodiments, the shell 4 includes a cylindrical section with openings in two ends, a closure head arranged at a first end of the cylindrical section and fixedly connected with the cylindrical section, and a fast-opening blind 1 arranged at a second end of the cylindrical section and fixedly connected with the cylindrical section. Optionally, the closure head and the fast-opening blind 1 can be fixedly connected with the cylindrical section in a welded manner. It should be noted that the fast-opening blind 1 belongs to a product in the existing art, and a construction principle thereof is omitted here. By the arrangement of the fast-opening blind 1, the shell 4 can be opened or closed conveniently and quickly.

Referring to FIG. 1, in some embodiments, the closure head is a rotator structure protruding away from the cylindrical section; and the closure head is also provided with an access hole 6 communicating with the inside of the closure head and a cover plate used to close and open the access hole 6. Optionally, the cover plate can be connected with a flange on the outer side of the access hole 6 through a bolt. By means of the arrangement of the access hole 6, the inside of the equipment can be checked or maintained.

Referring to FIGS. 1 and 3, in some embodiments, a top of the communicating pipe 8 is provided with a slope or a curved surface; the slope or curved surface extends in an axial direction of the communicating pipe 8; and the exhaust ports 17 of all the cyclone separators 7 pass through the top of the communicating pipe 8 and communicate with the inside of the communicating pipe 8. By the arrangement of the slope or the curved surface, the impurity particles discharged from the dust discharging port of the cyclone separator 7 fall onto the slope or the curved surface and can slide into the first cavity along the slope or the curved surface, so that the impurity particles are prevented from being gathered at the top of the communicating pipe 8, which facilitates unified collection and treatment. As shown in FIG. 3, optionally, two slopes are provided, which are intersected to form a conical structure; the two slopes are provided with the cyclone separators; and all the cyclone separators are distributed on the two slopes. Or, the cyclone separators are arranged on an intersecting line of the two slopes, that is, all the cyclone separators are arranged at an intersection of the two slopes. As such, the slopes are shorter, so that the impurities slide off from the slopes more easily.

As shown in FIG. 1, the first cavity, the second cavity, and the third cavity are respectively provided with process connection pipes 2 communicating with the insides of the cavities. By the arrangement of the process connection pipes 2, various detection elements are convenient to install.

As shown in FIG. 1, in some embodiments, a saddle support 10 is arranged on the outer wall of the shell 4. By the arrangement of the saddle support 10, the shell 4 can be better supported.

The principle and implementation modes of the present disclosure are described by applying specific examples in the present specification. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of the specification shall not be deemed as limitations to the present disclosure.

What is claimed is:

1. A horizontal type combined filter separator, comprising a filter separation assembly, a plurality of cyclone separators for tangential gas feeding, a shell which has a closed cavity inside and is of a barrel-shaped structure, wherein the inside of the shell is sequentially divided into a first cavity, a second cavity and a third cavity from a first end to a second end; and a fourth cavity with a volume less than that of the first cavity is formed in the first cavity, wherein the combined filter separator further, and a communicating pipe with one opened end and one closed end; wherein the closed end of the communicating pipe extends into the first cavity, and the opened end passes through the second cavity and extends into the third cavity; the shell is provided with a gas intake connection pipe communicating with the fourth cavity; said plurality of cyclone separators are provided in the fourth cavity a gas inlet of each cyclone separator communicates with the fourth cavity; a dust discharging port communicates with the first cavity; an exhaust port extends into the communicating pipe; the third cavity communicates with the second cavity through the filter separation assembly; and the shell is provided with a gas outlet connection pipe communicating with the second cavity.

2. The horizontal type combined filter separator according to claim 1, wherein a plurality of filter separation assemblies are provided; each filter separation assembly comprises a filter element and a filter element bracket; the number of the filter elements is the same as the number of the filter element brackets, and the filter elements and the filter element brackets correspond to each other on a one-to-one basis; each filter element bracket is of a hollow structure, one end of which communicates with the second cavity, and the other end of which communicates with the third cavity; and the filter elements are arranged at the ends of the corresponding filter element brackets located in the third cavity to filter gas entering the second cavity.

3. The horizontal type combined filter separator according to claim 1, wherein the shell comprises a cylindrical section with openings in two ends, a closure head arranged at a first end of the cylindrical section and fixedly connected with the cylindrical section, and a fast-opening blind arranged at a second end of the cylindrical section and fixedly connected with the cylindrical section.

4. The horizontal type combined filter separator according to claim 3, wherein the closure head is a rotator structure protruding away from the cylindrical section; and the closure head is also provided with an access hole communicating with the inside of the closure head and a cover plate used to close and open the access hole.

5. The horizontal type combined filter separator according to claim 1, wherein a top of the communicating pipe is provided with a slope or a curved surface; the slope or curved surface extends in an axial direction of the communicating pipe; and the exhaust ports of all the cyclone separators pass through the top of the communicating pipe and communicate with the inside of the communicating pipe.

6. The horizontal type combined filter separator according to claim 5, wherein two slopes are provided, which are intersected to form a conical structure;
    the cyclone separators are arranged on the two slopes; or,
        the cyclone separators are arranged on an intersecting line of the two slopes.

7. The horizontal type combined filter separator according to claim 1, wherein the first cavity, the second cavity, and the third cavity are respectively provided with process connection pipes communicating with the insides of the cavities.

8. The horizontal type combined filter separator according to claim 1, wherein a saddle support is arranged on an outer wall of the shell.

\* \* \* \* \*